United States Patent
Foster et al.

(10) Patent No.: US 9,989,986 B2
(45) Date of Patent: Jun. 5, 2018

(54) HITCH POSITION ENCODER WITH REFERENCE INDICATOR FOR AGRICULTURAL WORK VEHICLE

(71) Applicant: CNH Industrial America LLC, New Holland, PA (US)

(72) Inventors: Christopher Alan Foster, Lititz, PA (US); Richard Paul Strosser, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 277 days.

(21) Appl. No.: 13/797,280

(22) Filed: Mar. 12, 2013

(65) Prior Publication Data

US 2014/0265239 A1    Sep. 18, 2014

(51) Int. Cl.
*A01B 63/10*    (2006.01)
*G05G 1/10*    (2006.01)

(52) U.S. Cl.
CPC .......... *G05G 1/105* (2013.01); *A01B 63/1006* (2013.01); *Y10T 74/20396* (2015.01); *Y10T 137/85986* (2015.04)

(58) Field of Classification Search
CPC .............. A01B 63/102; A01B 63/1117; A01B 63/1006
USPC ................................................. 172/2; 701/50
See application file for complete search history.

(56) References Cited

U.S. PATENT DOCUMENTS

| | | | |
|---|---|---|---|
| 4,934,463 A * | 6/1990 | Ishida et al. | 172/4.5 |
| 4,969,527 A | 11/1990 | Boe et al. | |
| 4,979,092 A * | 12/1990 | Bergene et al. | 700/28 |
| 5,421,416 A * | 6/1995 | Orbach et al. | A01B 63/1117 172/3 |
| 5,499,684 A * | 3/1996 | Stratton | 172/4.5 |
| 6,016,875 A * | 1/2000 | Orbach et al. | 172/2 |
| 6,092,013 A | 7/2000 | Stelzle et al. | |
| 6,547,012 B2 | 4/2003 | Scarlett et al. | |
| 6,725,142 B2 * | 4/2004 | Koch | 701/50 |

(Continued)

FOREIGN PATENT DOCUMENTS

| | | |
|---|---|---|
| DE | 3522823 A1 | 1/1987 |
| EP | 2016817 A1 | 1/2009 |
| WO | 2012156085 A1 | 11/2012 |

OTHER PUBLICATIONS

PCT ISR & WO dated Sep. 17, 2014 for Application No. PCT/US2014/024666.

*Primary Examiner* — Thomas B Will
*Assistant Examiner* — Joel F. Mitchell
(74) *Attorney, Agent, or Firm* — Rickard K. DeMille; Rebecca L. Henkel

(57) ABSTRACT

An output control system of an agricultural work vehicle includes a controller, a reference indicator communicatively coupled to the controller, and a dial communicatively coupled to the controller. The controller is configured to control power output through an output value range between a minimum output value and a maximum output value based at least in part on a manual input signal, to determine a current setting of the power output, and to adjust the power output from the current setting upon receipt of the manual input signal. The reference indicator is configured to indicate the current setting. Adjustment of an orientation of the dial from an initial position generates the manual input signal.

8 Claims, 5 Drawing Sheets

(56) References Cited

U.S. PATENT DOCUMENTS

| | | | |
|---|---|---|---|
| 6,935,434 B1 * | 8/2005 | Easton et al. | A01B 63/00 |
| | | | 172/439 |
| 7,142,968 B2 | 11/2006 | Alexander et al. | |
| 7,168,192 B2 * | 1/2007 | Joergensen | 37/348 |
| 7,721,813 B2 | 5/2010 | Hou | |
| 8,090,507 B2 | 1/2012 | Yegerlehner et al. | |
| 2006/0030989 A1 | 2/2006 | Alexander et al. | |
| 2012/0073842 A1 | 3/2012 | Yegerlehner et al. | |

* cited by examiner

US 9,989,986 B2

HITCH POSITION ENCODER WITH REFERENCE INDICATOR FOR AGRICULTURAL WORK VEHICLE

BACKGROUND

The invention relates generally to agricultural equipment, and more specifically, to a hitch position encoder with reference indicator.

An agricultural work vehicle may be used for a variety of agricultural purposes, such as to prepare a field for planting, maintaining a field, harvesting, and so forth. Additionally, an agricultural work vehicle may be coupled to a variety of agricultural implements, such as cutters, mowers, loaders, blades, backhoes, tillers, planters, snow blowers, rippers, or other implements. The agricultural implements may be coupled to a hitch, such as a three point hitch, of the work vehicle. User inputs are used to control the output of the work vehicle and the implements, such as the ground speed of the work vehicle, load on the work vehicle from the implement, and position of the implement. For example, a dial may be manually rotated to adjust a current setting of an output. The dial has a limited range of motion that corresponds to a range of output values. Some adjustments to the output may be automated during operation of the work vehicle so that the output is adjusted without manual manipulation of the dial. Unfortunately, during automated operation the dial may become unsynchronized so that the dial no longer corresponds to the current setting of the output. In addition, synchronization of the dial with the current setting may be confusing, time consuming, or both.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an output control system of an agricultural work vehicle includes a controller, a reference indicator communicatively coupled to the controller, and a dial communicatively coupled to the controller. The controller is configured to control power output through an output value range between a minimum output value and a maximum output value based at least in part on a manual input signal, to determine a current setting of the power output, and to adjust the power output from the current setting upon receipt of the manual input signal. The reference indicator is configured to indicate the current setting. Adjustment of an orientation of the dial from an initial position generates the manual input signal.

In another embodiment, an agricultural implement control system includes a dial configured to generate a manual input signal based at least in part on manual adjustment of the dial from an initial orientation, a reference indicator configured to indicate a current position of an agricultural implement within a range of motion, and a controller communicatively coupled to the dial and to the reference indicator. The controller is configured to adjust the current position of the agricultural implement through the range of motion. The controller is configurable in a plurality of modes, including a manual mode and an automatic mode. The manual mode is configured to control the adjustment of the agricultural implement from the current position within the range of motion based at least in part on the manual input signal. The automatic mode is configured to control the adjustment of the agricultural implement based at least in part on a set of input parameters. The controller is configured to transition from the automatic mode to the manual mode in response to the receipt of the manual input signal without synchronizing an orientation of the dial with the current position In a further embodiment, an agricultural work vehicle includes an adjustable hitch configured to couple to an agricultural implement, a controller communicatively coupled to the adjustable hitch, a reference indicator communicatively coupled to the controller, and a dial communicatively coupled to the controller. The controller is configured to control the adjustable hitch through a range of motion based at least in part on a manual input signal, to determine a current position of the adjustable hitch within the range of motion, and to instruct the adjustable hitch to move from the current position upon receipt of the manual input signal. The reference indicator is configured to indicate the current position of the adjustable hitch. Manual rotation of the dial from an initial position generates the manual input signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The output control system described herein improves the ease and convenience of manual control of an agricultural work vehicle and/or agricultural implement. Various user inputs are used to control the operation of the agricultural work vehicle, such as ground speed, output to a power take-off (PTO), steering, and so forth. Additionally, user inputs to various implements are used to control the operation of the implements, including but not limited to hitch position relative to the work vehicle, header height relative to a field, orientation of the implement, draft, and so forth. Presently contemplated embodiments include a dial to provide user input for controlling the operation of an output of the work vehicle and/or the implement, such as adjusting the current setting of the output. Rotation of the dial generates a manual input signal that corresponds to the direction and/or speed of rotation. In some embodiments, the dial does not have any stops or detents, and the dial may be rotated substantially infinitely about a dial axis. That is, an orientation of the dial is not directly synchronized with the current setting of the respective output. Instead, the manual input signal, which is generated by rotation of the dial, adjusts the output from the current setting to a higher or lower setting depending on the direction of rotation. A reference indicator for the dial indicates the current setting of the respective output. The output control system enables the operator to manipulate the dial to adjust the respective output without synchronizing the dial to the current setting of the output.

Figure 1:
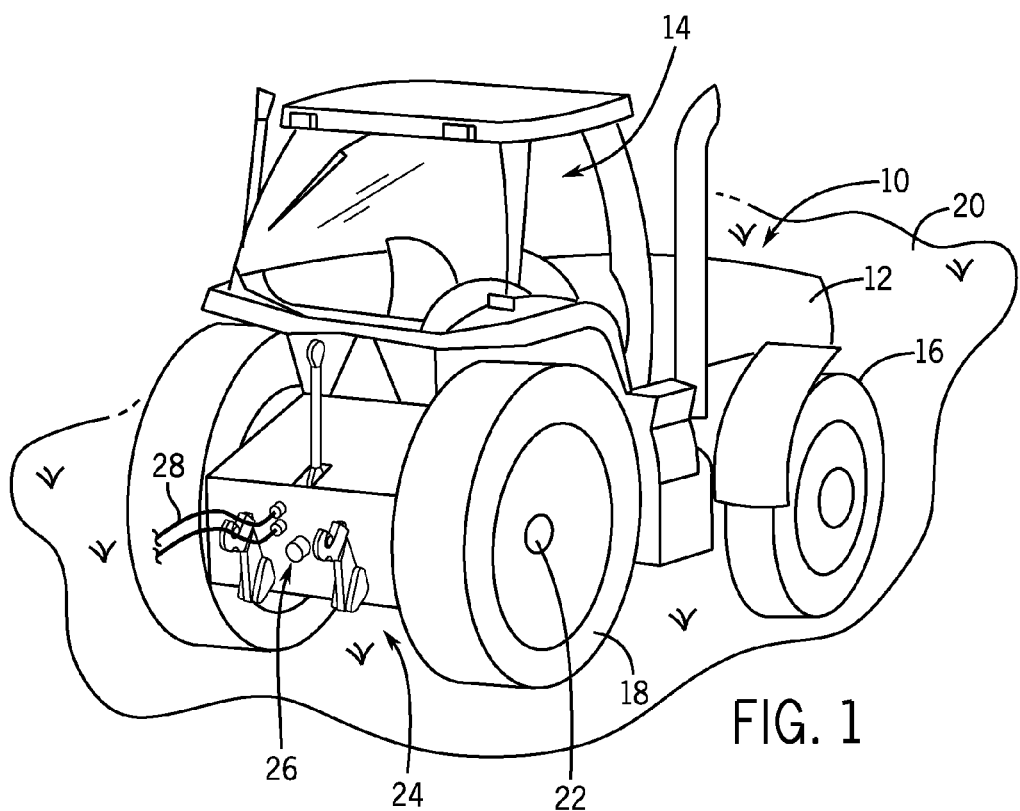
FIG. 1 is a perspective view of an embodiment of an agricultural work vehicle with an adjustable hitch.

Turning now to the drawings, FIG. 1 is a perspective view of an agricultural work vehicle 10 (e.g., tractor, off-road vehicle, work vehicle) with an output control system. The illustrated vehicle 10 has a body 12 that houses an engine, transmission, cooling system, and power train. The agricultural work vehicle 10 has a cabin 14 where an operator may sit or stand to operate the vehicle 10. The vehicle 10 has two front wheels 16 and two rear wheels 18 that rotate to move the vehicle 10 along the ground 20 at a ground speed. The wheels 18 are coupled to an axle 22 (e.g., fixed or suspended) that supports the wheels 18, and facilitates wheel rotation.

As discussed in detail below, the vehicle 10 may include a hitch 24 (e.g., three-point adjustable hitch) configured to couple an agricultural implement to the vehicle 10. Agricultural implements include, but are not limited to, a cutter, a mower, a loader, a blade, a backhoe, a cultivator, a plough, bale forks, a planter, a snow blower, or a ripper. The hitch 24 may be adjusted to change a height and/or orientation of the agricultural implement relative to the ground 20. A power take-off (PTO) shaft 26 extends from the vehicle 10 to transfer power from the vehicle 10 to the coupled agricultural implement. One or more hydraulic lines 28 may connect to hydraulic remotes of the coupled agricultural implement to transfer power. The operator controls operation of the vehicle 10 and agricultural implement via a console in the cabin 14. Certain outputs of the work vehicle 10 and agricultural implement are controlled with an output control system that may be adjusted through the console. For example, the operator may control the ground speed of the vehicle 10, the position of the hitch 24, the power output through the PTO 26, and the power output through the hydraulic lines 28 through the console. As discussed below, the output control system includes one or more dials to control respective outputs of the vehicle 10 and/or agricultural implement (e.g., via manual input in a manual mode). The output control system may also enable the operator to automate some outputs (e.g., via an automatic mode). For example, the output control system may enable the operator to automatically maintain the ground speed, to automatically maintain a height of the agricultural implement relative to the field 20, or to automatically maintain a load on the vehicle 10 below a desired value. One or more reference indicators of the output control system indicate the current settings (e.g., speed, height, position, load) of the vehicle 10 and agricultural implement during operation in the manual or automatic modes.

Figure 2:
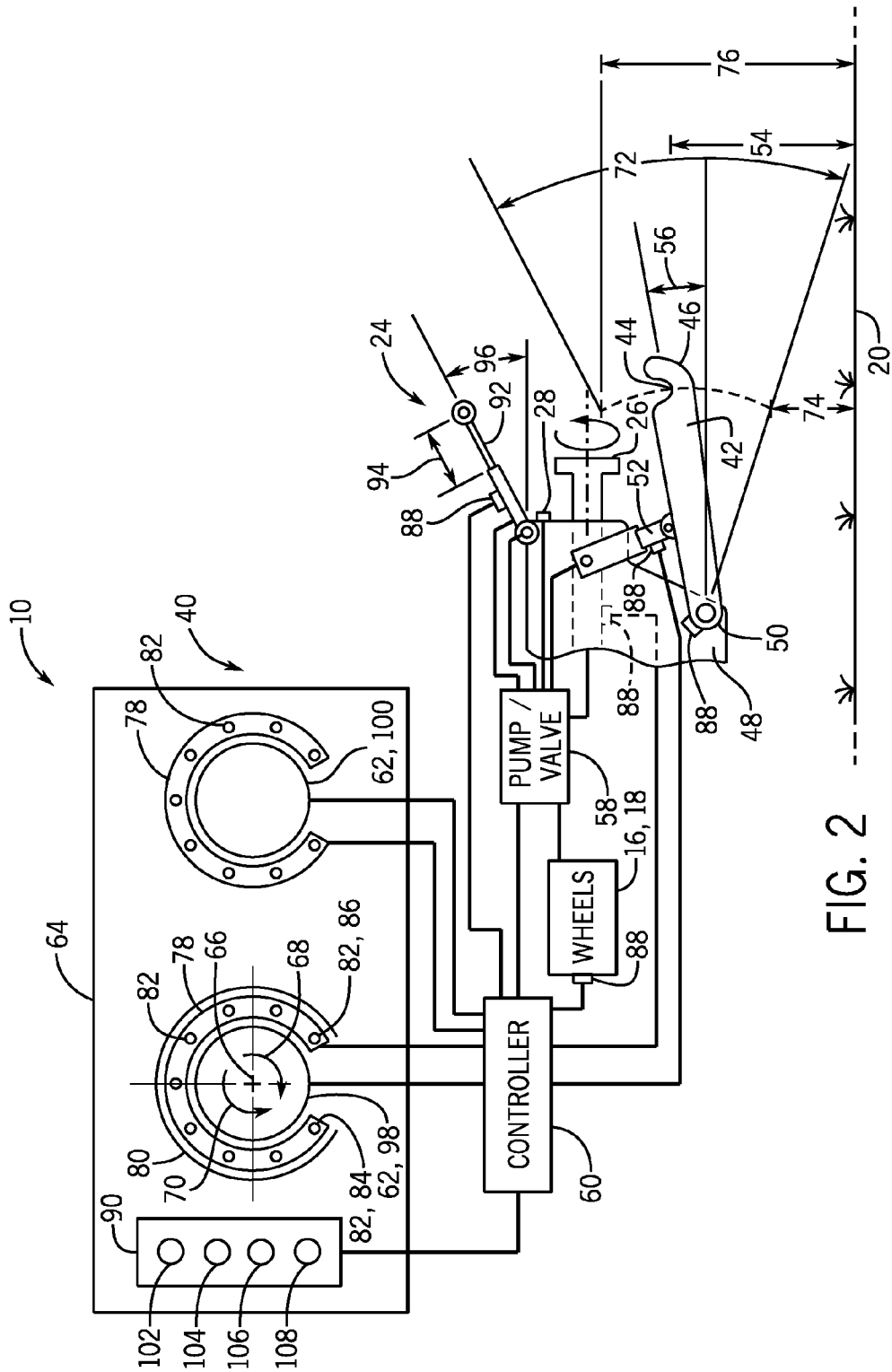
FIG. 2 is a schematic diagram of an embodiment of an output control system for the agricultural work vehicle.

FIG. 2 is a schematic diagram of an embodiment of an output control system 40 for the work vehicle 10. The illustrated output control system 40 is communicatively coupled to an adjustable hitch 24 to control the position of the hitch 24 relative to the work vehicle 10 and to the ground 20. Other embodiments of the output control system 40 may be communicatively coupled to other devices/outputs, such as the wheels 16 and 18, the PTO 26, or other outputs (e.g., hydraulic lines 28) of the work vehicle 10 or the adjustable hitch 24. The output (e.g., power output) may be an electric, pneumatic, or hydraulic power output.

The adjustable hitch 24 has one or more bottom arms 42, each having an attachment point 44 at a free end 46 to facilitate coupling with an agricultural implement. The bottom arms 42 are rotatably coupled to a frame 48 of the work vehicle 10 by a joint 50. One or more actuators (e.g., pneumatic cylinders, hydraulic cylinders) 52 may adjust an arm height 54 (e.g., height of the attachment point 44 above the ground 20) and/or an arm angle 56 of the bottom arms 42. A hydraulic pump and/or valve 58 (e.g., driven off the engine or driven by an electric motor) is fluidly coupled to the actuators 52 to control the bottom arms 42 based at least in part on control signals from a controller 60. In some embodiments, the pump/valve 58 (e.g., an electronic variable pump) is driven off the engine or driven by an electric motor. In some embodiments, the pump/valve 58 is an electro-hydraulic valve. The control signals are based at least in part on manual input signals from a dial 62 in a console 64 of the cabin 14.

The dial 62 transmits manual input signals to the controller 60 in response to manipulation by the operator. The dial 62 is rotated about a dial axis 66. The dial 62 rotates freely in a clockwise direction 68 and in a counter-clockwise direction 70 without stops to limit the possible orientations of the dial 62. That is, the dial 62 may rotate freely more than 360 degrees in either direction 68 or 70 without a physical structure to stop the rotation. In some embodiments, the dial 62 may move in steps, such as approximately 5, 10, 15, 18, 20, or 30 degree increments about the dial axis 66. Each step may hold the dial 62 in a particular orientation until further manipulation adjusts the dial 62 in either direction 68, 70. The dial 62 has an encoder, such as a rotary encoder, to transmit the manual input signals to the controller 60. The encoder may be an interval (e.g., relative) encoder. The interval encoder transmits manual input signals to the controller 60 when rotated, and the controller 60 then determines the appropriate response based at least in part on the direction of rotation and the current setting of the bottom arms 42. For example, the controller 60 may count the rotations of the rotary encoder to determine and/or track the orientation of the dial 62. A manual input signal from rotating the dial 62 in the clockwise direction 68 may increase the arm angle 56 and/or increase the arm height 54. Similarly, a manual input signal from rotating the dial 62 in the counter-clockwise direction 70 may decrease the arm angle 56 and/or decrease the arm height 54. However, in some embodiments, rotating the dial 62 in the clockwise direction 68 decreases the arm angle 56 or arm height 54, and rotating the dial 62 in the counter-clockwise direction 70 increases the arm angle 56 or arm height 54.

The manual input signals are indicative of a magnitude and/or a direction of rotation of the dial 62. The controller 60 receives the manual input signals from the dial 62 and controls the bottom arms 42 (or other device communicatively coupled to the dial 62) based at least in part on the manual input signals. For example, in the illustrated embodiment, the controller 60 controls the bottom arms 42 and/or other devices by adjusting an output of the pump/valve 58. The controller 60 adjusts the bottom arms 42 through an output value range between a minimum output value and a maximum output value. For example, the controller 60 may adjust the bottom arms 42 through a range of motion 72 of approximately 30, 45, 60, or 90 degrees about the joint 50 to adjust the height 54 between a minimum height 74 and a maximum height 76. The range of motion 72 is determined by physical constraints of the work vehicle 10 or implement. The operator may adjust the minimum height 74 and the maximum height 76 within the range of motion 72 to establish a subrange of the range of motion 72.

The controller 60 adjusts the bottom arms 42 through the range of motion 72 based at least in part on the manual input signal and the current position of the bottom arms 42. For example, the controller 60 may raise the bottom arms 42 to a new position in response to rotation of the dial 62 in the clockwise direction 68 to a new set point, until the bottom arms 42 reach the maximum height 76. That is, the controller 60 may disregard subsequent manual input signals to raise the bottom arms 42 beyond the maximum height 76. However, due to the configuration of the dial 62, further rotation of the dial 62 may not be restricted, and the dial 62 may continue to rotate freely in the clockwise direction 68. The disregarded manual input signals transmitted from the dial 62 are considered invalid input signals. However, the controller 60 considers subsequent valid manual input signals (e.g., from rotating the dial 62 in the counter-clockwise direction 70) to lower the bottom arms 42 from the maximum height 76. Because rotation of the dial 62 to a new set point instructs the controller 60 to adjust the position of the bottom arms 42 from the current position, synchronization of the dial 62 with the current position of the bottom arms 42 is obviated. Furthermore, the controller 60 may instruct the bottom arms 42 to lower in response to turning the dial 62 in the counter-clockwise direction 70 until the bottom arms 42 reaches the minimum height 74. The controller 60 may disregard subsequent invalid manual input signals to lower the bottom arms 42 beyond the minimum height 74.

A reference indicator 78 in the cabin provides feedback to the operator indicative of the current position of the bottom arms 42. In some embodiments, the reference indicator 78 is positioned adjacent to and/or around the dial 62, with a legend 80 to indicate the current position and current position set point of the bottom arms 42. Light emitting diodes 82 (LEDs) may be used to indicate the current position and/or the current position set point. For example, when the bottom arms 42 are controlled to the minimum height 74, only a first LED 84 is illuminated. Raising the bottom arms 42 from the minimum height 74 causes other LEDs 82 of the reference indicator 78 to sequentially illuminate in the clockwise direction 68 about the dial axis 66. At the maximum height 76, all the LEDs 82 of the reference indicator 78, or in certain embodiments only the last LED 86, is illuminated. In some embodiments, the reference indicator 78 may indicate the current position and current position set point of the bottom arms 42 with different light sources or visual indications. For example, the reference indicator 78 may illuminate red LEDs 82 to indicate the current position and a blue LED 82 to indicate the current position set point. In some embodiments, the current position of the bottom arms 42 may lag behind the current position set point for a brief time after the dial 62 is adjusted. In some embodiments, the reference indicator 78 and/or controller 60 may produce an audible signal (e.g., tone) or haptic feedback (e.g., dial vibration) to indicate when the current position and/or current position set point is at or near the minimum height 74 and maximum/or height 76.

The output control system includes one or more sensors 88 to determine the current position of the bottom arms 42. The sensors 88 are communicatively coupled to the controller 60, and may include, but are not limited to, position sensors, torque sensors, rotation sensors, accelerometers, or pressure sensors, or combinations thereof. The controller 60 determines the current position of the bottom arms 42 through feedback from the sensors 88. In some embodiments, the controller 60 determines the current position of the bottom arms 42 through monitoring the adjustments to the bottom arms 42 from a known initial position (e.g., minimum height 74). The sensors 88 enable the reference indicator 78 to provide feedback indicative of the current position of the bottom arms 42 during operation of the work vehicle 10.

In some embodiments, the controller 60 may provide automatic control of the bottom arms 42 during operation of the work vehicle 10. For example, the operator may use input controls 90 on the console 64 to establish a set of input parameters for automatically controlling of the bottom arms 42. For example, the input controls 90 may enable an operator to instruct the controller 60 to enter an automatic mode to maintain the height 54 of the bottom arms 42 (e.g., at approximately 12 inches), to maintain an implement engagement depth using the bottom arms 42, or to maintain a load (e.g., draft setting) on the adjustable hitch 24, or any combination thereof. In the automatic mode, the controller 60 adjusts the bottom arms 42 based on the set of input parameters and current operating conditions. For example, the controller 60 may instruct the bottom arms 42 to raise or lower automatically without manual input during operation over uneven terrain. While in the automatic mode, the current position of the bottom arms 42 may become unsynchronized from the current orientation of the dial 62. That is, the controller 62, in the automatic mode, adjusts the bottom arms 42 independently of the orientation of the dial 62 so that the orientation of the dial 62 does not necessarily correspond to the current position of the bottom arms 42. The dial 62 does not change orientation with the adjustments to the position of the bottom arms 42 during the automatic mode.

The operator may interrupt automatic control and resume manual control of the bottom arms 42 via rotation of the dial 62 while the controller is in the automatic mode. As discussed above, manual rotation of the dial 62 transmits manual input signals to the controller 60. The controller 60, in turn, adjusts the bottom arms 42 from the current position (e.g., from the position previously commanded by the controller 60 during the automatic mode). For example, the operator may rotate the dial 62 to a first orientation that instructs the controller 60 to move the bottom arms 42 to a first position (e.g., a height 54 of approximately 6 inches). The operator may then re-engage the automatic mode, thereby enabling the controller 60 to maintain a desired height 54 or the bottom arms 42 (e.g., of approximately 10 inches). To maintain the desired height 54, the controller 60 may adjust the bottom arms 42 to one or more second positions, different from the first position, during operation in the automatic mode. At any time, the operator may rotate the dial 62 to interrupt automatic control and resume manual control of the bottom arms 42. The controller 60 instructs the bottom arms 42 to raise or lower from the second position in response to rotation of the dial 62. That is, the controller 60 adjusts the position of bottom arms 42 in response to rotating the dial 62 without prior synchronization of the orientation of the dial 62 to the current position.

As a result, the operator may quickly interrupt automatic control and resume manual control of the bottom arms 42 because the orientation of the dial 62 is independent of the current position of the bottom arms 42. Moreover, obviating the step of synchronizing the orientation of the dial 62 with the current position of the bottom arms 42 simplifies the transition from automatic mode to manual mode. In some embodiments, any rotation of the dial 62 during the automatic mode transitions the controller 60 to the manual mode. In other embodiments, only rotations of the dial 62 that transmit valid manual input signals transition the controller 60 from the automatic mode to the manual mode.

In some embodiments, the work vehicle 10 may enter a powered-down mode in which one or more of the controller 60, the reference indicator 78, and the pump/valve 58, are turned off. In some embodiments of the powered-down mode, the actuators 52 may substantially maintain the current position of the bottom arms 42. The work vehicle 10 may resume operation and enter a startup mode that activates the devices that were previously deactivated in the powered-down mode in response to operator input. In some embodiments, the position of the bottom arms 42 may vary while the work vehicle 10 is in the powered-down mode. For example, maintenance, settling, or leaking of hydraulic seals may cause the bottom arms 42 to be in a different (e.g., lower) position upon entering the startup mode. Upon entering the startup mode, the controller 60 determines the current position and provides feedback via the reference indicator 78. As a result the current position of the bottom arms 42 is conveyed to the operator prior to adjustment of the dial 62. The operator may adjust the position of the bottom arms 42 upon entering the startup mode without synchronizing the orientation of the dial 62 to the current position. The manual input signals direct the controller 60 to adjust the position of the bottom arms 42 relative to an initial position, rather than synchronizing arm position to a particular orientation of the dial 62. That is, the operator may rotate the dial 62 to adjust the position of the bottom arms 42 without first rotating the dial 62 to an orientation that synchronizes the dial position with the arm position.

In the illustrated embodiment, the adjustable hitch 24 includes a top arm 92 configured to couple with the agricultural implement. The top arm 92 may be coupled to one or more actuators to adjust an extension distance 94 and a link angle 96 of the top arm 92. In some embodiments, the PTO 26 may be arranged within or proximate to the hitch assembly 24. The controller 60 may control the power output to one or more of the bottom arms 42, the top arm 92, the PTO 26, the wheels 16 and 18, and other devices of the work vehicle 10. In some embodiments, the console 64 has multiple dials 62 to control multiple outputs. For example, a first dial 98 may control the bottom arms 42 through the range of motion 72, as discussed above. The second dial 100 may control the power output supplied to the wheels 16, 18 to control the ground speed of the work vehicle 10 between a minimum speed (e.g., 0 miles per hour) and a maximum speed (e.g., 25 miles per hour). In some embodiments, one dial 62 may be used to control multiple outputs through input controls 90. In some embodiments, the input controls 90 are used to adjust the range of motion 72, to set a maximum draft on the adjustable hitch 24, and/or to select the type of agricultural implement coupled to the adjustable hitch 24. For example, a first input control 102 may direct the dial 62 to control the height 54 of the bottom arms 42, a second input control 104 may direct the dial 62 to control the position of the top arm 92, a third input control 106 may direct the dial 62 to control the speed or torque of the wheels 16, 18, and a fourth input control 108 may direct the dial 62 to control the speed or direction of rotation of the PTO 26.

Figure 3:
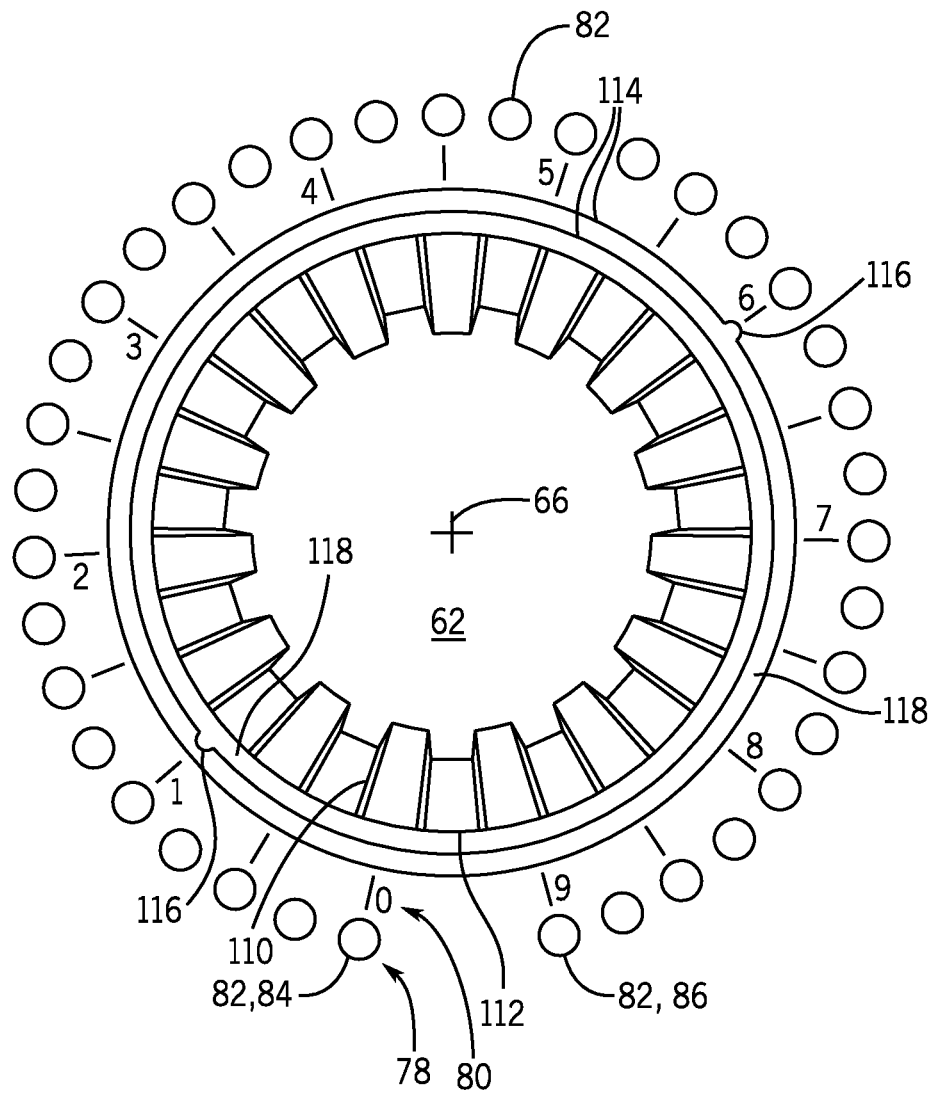
FIG. 3 is a front view of an embodiment of a dial and reference indicator that may be employed within the output control system of FIG. 2.

FIG. 3 is a front view of an embodiment of a dial 62 for adjusting a power output, and a reference indicator 78 for indicating a current setting of the power output. As discussed above, the dial 62 is rotated about a dial axis 66. In some embodiments, the dial 62 has surface features 110 (e.g., ridges, grooves, etc.) arranged along a radial perimeter 112 to facilitate manual rotation. The reference indicator 78 includes multiple light sources 82 (e.g., LEDs) circumferentially spaced about the dial 62. The reference indicator 78 may include approximately 3, 4, 5, 6, 7, 8, 9, 10, 15, 20, 30, or more light sources 82. In some embodiments, the legend 80 corresponds to the arrangement of the light sources 82. The legend 80 facilitates interpretation of the reference indicator 78. For example, the legend 80 may indicate angles within the range of motion 72, height 54 from the ground 20 (e.g., in inches), percentage of maximum output value (e.g., speed, torque, etc.), or arbitrary set points (e.g., 2 to 9). For example, with respect to FIGS. 2 and 3, when the bottom arms 42 are at the minimum height 74, only the first LED 84 may be illuminated. The first LED 84 at the point marked "0" in the legend 80 of FIG. 3 may correspond to approximately 30 degrees below horizontal about the joint 50. When the bottom arms 42 are at the maximum height 76, all the LEDs 82, or only the last LED 86, may be illuminated. The last LED 86 at the point marked "9" in the legend 80 of FIG. 3 may correspond to approximately 60 degrees above horizontal about the joint 50. The possible range of motion 72 may be greater or less than 90 degrees in other embodiments. In some embodiments, the controller 60 may adjust the brightness and/or color of the reference indicator 78. For example, the controller 60 may decrease the brightness during operation while lights of the vehicle 10 are turned on, and may increase the brightness during operation while lights of the vehicle 10 are turned off.

In some embodiments, one or more range controls 114 may be employed to adjust the output value range of the power output. In the illustrated embodiments, range controls 114 form concentric rings about the dial 62. In other embodiments, the range controls 114 are separate from the dial 62. The range controls 114 may be used to establish input parameters for the minimum and maximum values of a subrange within the range of motion 72 of the bottom arms 42. Accordingly, the subrange may restrict the range of motion for control in the automatic mode and/or manual mode. Each range control 114 may have a marking 116 that may be aligned with the legend 80 to establish the bounds of the subrange. For example, the range controls 114 as shown in FIG. 3 establish a subrange between the points marked "1" and "6" on the legend 80. This arrangement of range controls may decrease the range of motion to between approximately 20 degrees below horizontal and approximately 30 degrees above horizontal. In some embodiments, the dial 62 and the reference indicator 78, alone or in combination with input controls 90, may be used to establish a subrange of motion. In some embodiments, the reference indicator 78 may indicate the bounds of the subrange. For example, LEDs 82 of the reference indicator 78 may illustrate the bounds of the subrange with a first color (e.g., blue) LED 82, the current position of the bottom arms 42 with a second color (e.g., red) LED 82, and the current position set point of the bottom arms 42 with a third color (e.g., green) LED 82. As may be appreciated, the colors of LEDs 82 include, but are not limited to blue, red, green, cyan, orange, magenta, or yellow, or any combination thereof.

Figure 4:
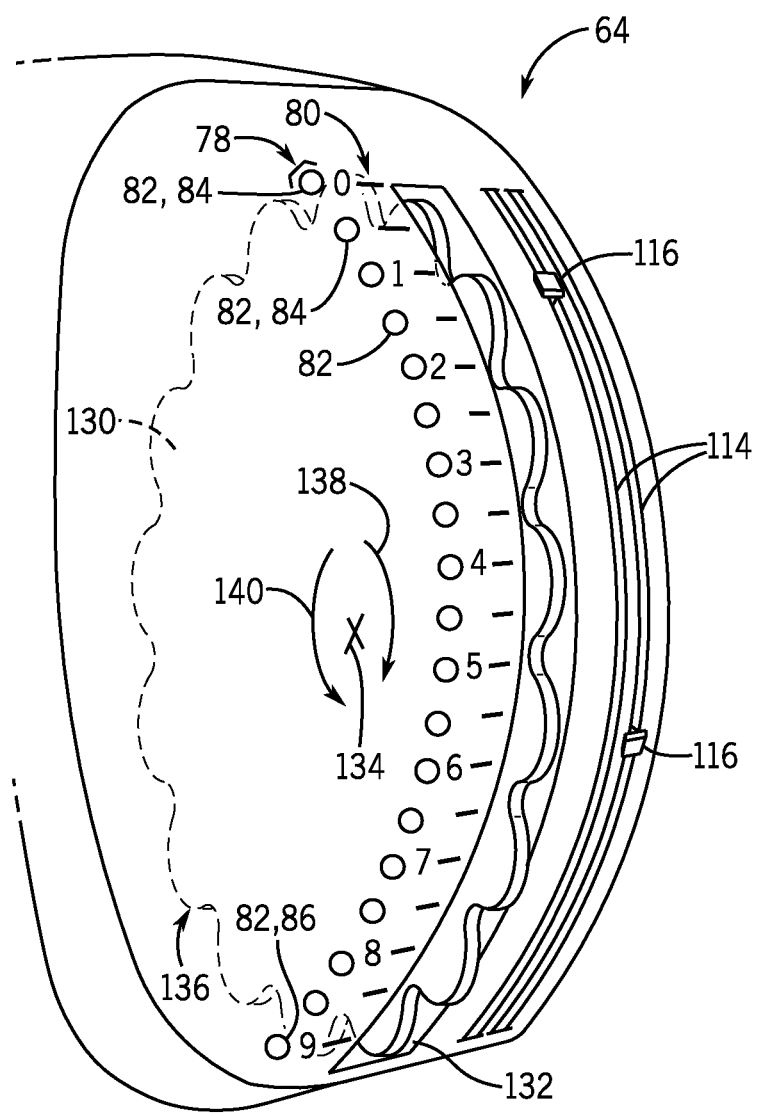
FIG. 4 is a perspective view of an embodiment of an alternative dial and reference indicator that may be employed within the output control system of FIG. 2.

FIG. 4 is a perspective view of an alternative dial embodiment of the output control system 40. A dial 130 within a channel 132 rotates about a dial axis 134 to control a power output. In some embodiments, the dial 130 has gear-shaped perimeter 136, as shown in FIG. 4. Alternatively, the dial 130 may have a smooth perimeter 136. In some embodiments, rotating the dial 130 in a first direction 138 transmits a manual input signal from an encoder (e.g. rotary encoder) to the controller 60 indicative of an increase in the power output (e.g., to raise the bottom arms 42). Rotating the dial 130 in a second direction 140 transmits a manual input signal to the controller 60 indicative of a decrease in the power output (e.g., to lower the bottom arms 42). In other embodiments, rotation of the dial in the first direction 138 decreases the power output, and rotation of the dial in the second direction increases the power output. As discussed above with reference to dial 62 in FIGS. 2 and 3, the dial 130 may rotate freely about the dial axis 134, without stops that may otherwise limit rotation. Rotation of the dial 130 adjusts the power output relative to the current setting/position. That is, the orientation of the dial 130 does not directly correlate with the current setting of the power output. In addition, adjusting the current setting (e.g., when in automatic mode) of the power output does not change the orientation of the dial 130. However, adjusting the orientation of the dial 130 adjusts the current setting of the power output. As discussed above, the dial 130 may control the power output within the output value range by sending manual input signals to the controller 60.

The reference indicator 78 and legend 80 may be arranged proximate to the channel 132. The reference indicator 78 may display the current setting of the power output by illuminating one or more LEDs 82 corresponding to a particular setting shown by the legend 80. In some embodiments, one or more range controls 114 establish subranges of motion based on the positioning of the markings 116. The range controls 114 may be within the channel 132, or elsewhere on the console 64 as shown in FIG. 4.

Figure 5:
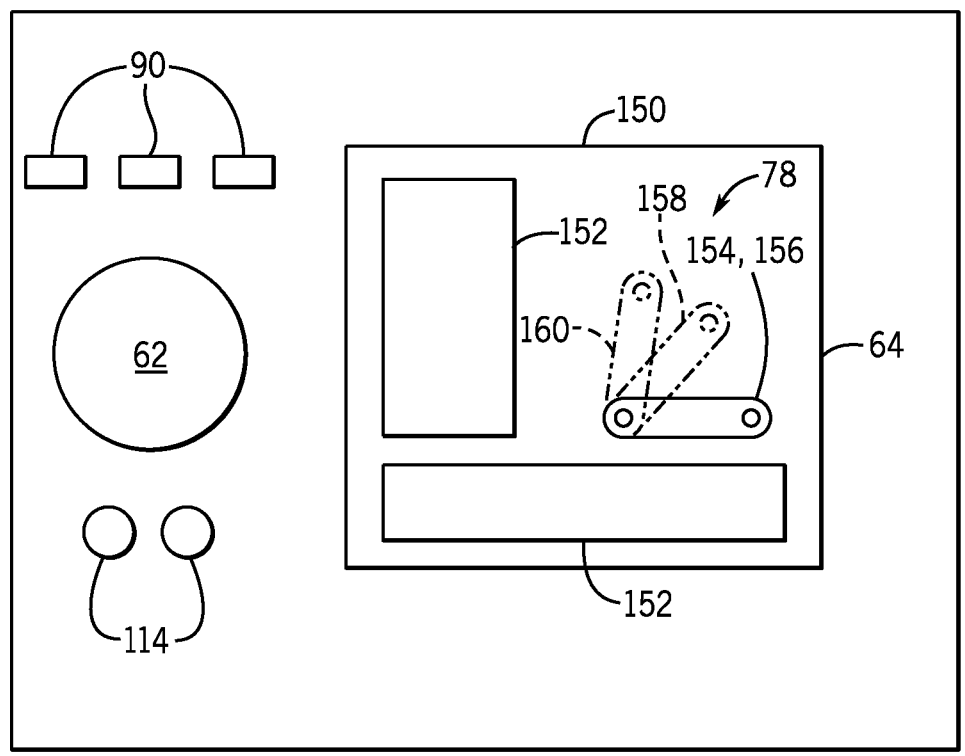
FIG. 5 is a front view of an embodiment of a dial and an electronic display with a reference indicator that may be employed within the output control system of FIG. 2.

FIG. 5 is a front view of an embodiment of the output control system 40 with an electronic display 150 in the console 64. The console 64 includes the dial 62 and the electronic display 150, and may also include input controls 90 and/or range controls 114. The dial 62 of FIG. 5 may operate in the same way as the dial 62 described above in FIGS. 2 and 3, or the dial 130 of FIG. 4. That is, the dial 62 may be used to adjust the power output (e.g., to the adjustable hitch) without synchronizing the orientation of the dial 62 with the current setting of the power output. The electronic display 150 may display the reference indicator 78 and system data 152. The system data 152 may include, but is not limited to, input parameters, work vehicle operating conditions (e.g., ground speed, engine speed, engine temperature, fluid levels, PTO output), agricultural implement conditions (e.g., height, draft), field positioning data, and global positioning coordinates. The reference indicator 78 may be selectively displayed on the electronic display 150. That is, it may be displayed on different portions of the electronic display 150, shown at certain intervals, or shown on demand. In some embodiments, the reference indicator 78 displays a graphical representation 154 of the power output, such as the position of the adjustable hitch 24. For example, the reference indicator 78 may display the adjustable hitch at the minimum height in a first position 156, an intermediate height in a second position 158, or the maximum height in a third position 160.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement control system, comprising:
   a dial configured to generate a manual input signal based at least in part on manual adjustment of the dial from an initial orientation;
   a reference indicator configured to indicate a current position of an agricultural implement within a range of motion; and
   a controller communicatively coupled to the dial and to the reference indicator and configured to adjust the current position of the agricultural implement through the range of motion, wherein the controller is configurable in a plurality of modes, comprising:
      a manual mode configured to control the adjustment of the agricultural implement from the current position within the range of motion based at least in part on the manual input signal; and
      an automatic mode configured to automatically control the adjustment of the agricultural implement within the range of motion based at least in part on a set of input parameters;
      wherein the controller is configured to transition from the automatic mode to the manual mode in response to the receipt of the manual input signal without synchronizing an orientation of the dial with the current position.

2. The agricultural implement control system of claim 1, comprising a hydraulic pump or hydraulic valve configured to supply hydraulic power to one or more hydraulic actuators, wherein the controller is communicatively coupled to the hydraulic pump or hydraulic valve and configured to instruct the hydraulic pump or hydraulic valve to control the adjustment of the agricultural implement via the one or more hydraulic actuators.

3. The agricultural implement control system of claim 1, comprising one or more input controls configured to adjust the set of input parameters.

4. The agricultural implement control system of claim 3, wherein the reference indicator comprises a plurality of light emitting diodes (LEDs) configured to indicate the range of motion, wherein the plurality of LEDs comprises LEDs of one or more colors.

5. The agricultural implement control system of claim 1, wherein the set of input parameters comprises a minimum value of the range of motion, a maximum value of the range of motion, a draft setting, or any combination thereof.

6. The agricultural implement control system of claim 1, wherein the controller is configurable in a powered-down mode and a startup mode, wherein the powered-down mode is configured to turn off at least the reference indicator and to stop control of the agricultural implement, and the startup mode is configured to turn on the reference indicator and to control the adjustment of the agricultural implement from the current position in response to a valid manual input signal without synchronizing the orientation of the dial with the current position.

7. The agricultural implement control system of claim 1, wherein the manual input signal comprises a valid manual input signal or an invalid manual input signal, and the controller is configured to transition from the automatic mode to the manual mode in response to receiving the valid manual input signal and to disregard an invalid manual input signal.

8. The agricultural implement control system of claim 1, comprising an input control communicatively coupled to the controller and configured to transition the controller from the manual mode to the automatic mode.

* * * * *